United States Patent
Tahara (10) Patent No.: US 9,719,811 B2
(45) Date of Patent: Aug. 1, 2017

(54) PHOTOELECTRIC ENCODER INCLUDING LIGHT-RECEIVING ELEMENT AND LIGHT-BLOCKING LAYER THAT FORMS LIGHT-BLOCKING PORTION AND LIGHT-TRANSMITTING PORTION ON LIGHT-RECEIVING ELEMENT

(71) Applicant: MITUTOYO CORPORATION, Kawasaki-shi, Kanagawa (JP)

(72) Inventor: Tomohiro Tahara, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 403 days.

(21) Appl. No.: 13/766,077

(22) Filed: Feb. 13, 2013

(65) Prior Publication Data

US 2013/0206970 A1 Aug. 15, 2013

(30) Foreign Application Priority Data

Feb. 15, 2012 (JP) .................................. 2012-030933

(51) Int. Cl.
*G01D 5/347* (2006.01)
*G01D 5/353* (2006.01)

(52) U.S. Cl.
CPC ..... *G01D 5/34746* (2013.01); *G01D 5/35383* (2013.01)

(58) Field of Classification Search
CPC ........ G01D 5/26; G01D 5/34; G01D 5/34746; G01D 5/35383; G01D 5/34715;
(Continued)

(56) References Cited

U.S. PATENT DOCUMENTS 6,956,200 B2 * 10/2005 Ohmura ................. G01D 5/347
  250/214.1
7,145,128 B2 * 12/2006 Tanaka ..................... 250/231.13
(Continued)

FOREIGN PATENT DOCUMENTS

CN 1550762 A 12/2004
CN 1773222 A 5/2006
(Continued)

OTHER PUBLICATIONS

European Search Report dated Jan. 7, 2015, 6 pages.

*Primary Examiner* — Que T Le
(74) *Attorney, Agent, or Firm* — Rankin, Hill & Clark LLP (57) ABSTRACT

A photoelectric encoder according to the present invention comprises a light-receiving unit including: a first and second light-receiving element column; and a light-blocking layer configured from a light-blocking portion and a light-transmitting portion, the first and second light-receiving element columns being disposed staggered in a second direction such that an arrangement pattern of light-receiving elements in the first and second light-receiving element columns has a pitch which is the same in a first direction and a phase which differs in the first direction, and the light-transmitting portion on the light-receiving surface of the light-receiving element in the first light-receiving element column and the light-transmitting portion on the light-receiving surface of the light-receiving element in the second light-receiving element column being formed so as not to overlap each other when staggered in the second direction.

12 Claims, 4 Drawing Sheets (58) Field of Classification Search
CPC ..... G01D 5/347; G01D 5/3473; H03M 1/143; H03M 1/22; H03M 1/30
USPC .... 250/221, 231.1–231.18, 239; 341/13, 14; 359/436–442; 356/138, 139, 356/139.03–139.09, 614–624; 33/1 N, 33/1 M, 1 L, 1 PT, 1 R, 1 SP
See application file for complete search history.

(56) References Cited

U.S. PATENT DOCUMENTS

| | | |
|---|---|---|
| 2004/0183000 A1 | 9/2004 | Ohmura et al. |
| 2005/0006572 A1* | 1/2005 | Kojima .................... 250/231.13 |
| 2007/0001108 A1 | 1/2007 | Sannomiya et al. |

FOREIGN PATENT DOCUMENTS

| | | |
|---|---|---|
| EP | 1477775 A2 | 11/2004 |
| EP | 2284498 A2 | 2/2011 |
| JP | 59-221667 | 12/1984 |
| JP | 2004-340612 | 12/2004 |
| JP | 2005-208015 | 8/2005 |

\* cited by examiner

PHOTOELECTRIC ENCODER INCLUDING LIGHT-RECEIVING ELEMENT AND LIGHT-BLOCKING LAYER THAT FORMS LIGHT-BLOCKING PORTION AND LIGHT-TRANSMITTING PORTION ON LIGHT-RECEIVING ELEMENT

CROSS-REFERENCE TO RELATED APPLICATIONS

This application is based upon and claims the benefit of priority from the prior Japanese Patent Application No. 2012-030933, filed on Feb. 15, 2012, the entire contents of which are incorporated herein by reference.

BACKGROUND OF THE INVENTION

Field of the Invention

The present invention relates to a photoelectric encoder used in precision measurement.

Description of the Related Art

Conventionally, a photoelectric encoder (below, sometimes referred to as "encoder") has been used in precision measurement of the likes of linear displacement or angular displacement. The encoder is mounted in the likes of a three-dimensional measuring instrument or an image measuring instrument. The encoder comprises: a light source; a scale including an optical grid; and a light-receiving unit including a plurality of light-receiving elements and having an index grid on a light-receiving surface, the index grid disposed so as to be movable along with the light source relatively to the scale and configured such that each of the light-receiving elements have phases that differ from each another.

Operation of the encoder is briefly explained. While moving the scale relatively to the light source and the light-receiving unit, light from the light source is irradiated onto the index grid via the optical grid of the scale. This results in generation of a plurality of (for example, four) light-and-dark patterns of sinusoidal light having different phases. These light-and-dark patterns of sinusoidal light represent a light signal. An electrical signal is generated by photoelectric conversion when these light-and-dark patterns of light having different phases are received by the light-receiving elements corresponding to each phase, and this electrical signal is utilized to measure an amount of linear displacement, and so on.

Incidentally, in the case of an encoder having an object of one-dimensional measurement, the plurality of light-receiving elements are generally disposed in a line along a measurement axis (for example, JP 2005-208015 A).

Therefore, in order to increase resolution performance of measurement of the displacement amount, it is naturally desirable to dispose an increased number of light-receiving elements having small width in a measurement axis direction, in the light receiving unit. However, size of the light-receiving element is determined by a manufacturing process of the light-receiving element. In other words, in the case of employing conventional technology, it is difficult to make a detection pitch of the light-and-dark pattern of light smaller than a limit width in the measurement axis direction of the light-receiving element restricted by the manufacturing process of the light-receiving element.

The present invention was made in view of the above-mentioned problem and has an object of providing a photoelectric encoder realizing a higher resolution performance of the light-receiving unit.

SUMMARY OF THE INVENTION

A photoelectric encoder according to the present invention comprises: a light source; a scale for generating a light-and-dark pattern of light in a first direction along a measurement axis by light irradiated from the light source; and a light-receiving unit including: a first and second light-receiving element column each configured from a plurality of light-receiving elements, the light-receiving elements being arranged in the first direction and configured to detect the light-and-dark pattern of light; and a light-blocking layer configured from a light-blocking portion and a light-transmitting portion formed on a light-receiving surface of the light-receiving element, the light-blocking portion configured to block the light-and-dark pattern of light, and the light-transmitting portion configured to allow transmission of the light-and-dark pattern of light, the first and second light-receiving element columns being disposed staggered in a second direction orthogonal to the first direction such that an arrangement pattern of the light-receiving elements in the first and second light-receiving element columns has a pitch which is the same in the first direction and a phase which differs in the first direction, and the light-transmitting portion on the light-receiving surface of the light-receiving element in the first light-receiving element column and the light-transmitting portion on the light-receiving surface of the light-receiving element in the second light-receiving element column being formed so as not to overlap each other when staggered in the second direction.

In addition, the photoelectric encoder according to the present invention may also be further formed such that when a region of the light-receiving surface of the light-receiving element where the light-transmitting portion of the light-blocking layer is formed is assumed to be a light-receiving region, the light-blocking portion includes an overlapping region in the first direction of the light-receiving surface in the first light-receiving element column and the light-receiving region in the second light-receiving element column on the first light-receiving element column.

DETAILED DESCRIPTION OF THE EMBODIMENTS

A photoelectric encoder according to an embodiment of the present invention is described below with reference to the drawings.

Figure 1:
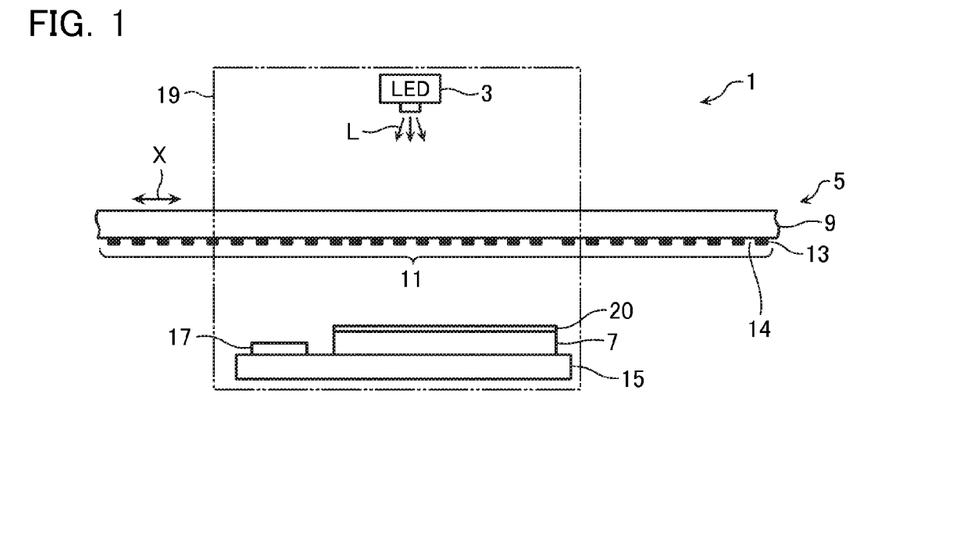
FIG. 1 is a view showing a schematic configuration of a photoelectric encoder according to an embodiment.

FIG. 1 is a view showing a schematic configuration of a photoelectric encoder 1 according to the embodiment of the present invention. This embodiment has its main feature in a structure of a light-receiving unit, and the photoelectric encoder 1 is described as a premise for understanding this main feature.

First, the configuration of the encoder 1 is described. The encoder 1 is configured from a light-emitting diode (LED) 3, a scale 5 for modulating light from the diode 3, and a light-receiving unit 7 for receiving light modulated by the scale 5.

Light L from the diode 3 is irradiated onto the scale 5. Now, the light-emitting diode 3 is one example of a light source. Moreover, the scale 5 includes a transparent substrate 9 of elongated shape configured from a transparent material such as glass, and in FIG. 1, part of that transparent substrate 9 is shown. An optical grid 11 is formed on a surface on an opposite side to a surface facing a light-emitting diode 3 side of the transparent substrate 9. The optical grid 11 has a plurality of light-blocking units 13 disposed linearly with a certain pitch and such that each of the light-blocking units 13 extends in a depth direction of the drawing. The light-blocking unit 13 is configured from a metal such as chromium, for example.

The light-receiving unit 7 is disposed having a gap with the scale 5. The light-receiving unit 7 is a semiconductor chip and mounted on a circuit substrate 15. A plurality of photodiodes not illustrated are formed in the light-receiving unit 7. A light-receiving surface of these photodiodes faces an optical grid 11 side. The photodiode is one example of a light-receiving element, and besides a photodiode, a phototransistor may also be employed as the light-receiving element. In addition, a light-blocking layer 20 described later is formed on an upper portion of the light-receiving unit 7. An IC chip 17 for calculation is mounted on the circuit substrate 15, and calculation of displacement amount is executed by the IC chip 17 based on a light-and-dark pattern of sinusoidal light (below, sometimes called "light signal") detected by the plurality of photodiodes in the light-receiving unit 7.

The circuit substrate 15, on which the light-receiving unit 7 and so on are mounted, is attached, along with the light-emitting diode 3, to a holder 19. The holder 19 is provided movably in a direction of a measurement axis which is a long direction of the scale 5 (below, called "X direction"). In other words, the photoelectric encoder 1 measures displacement amount by moving the holder 19 with respect to the scale 5 which is fixed. Note that the present embodiment may also be applied to a type where the light-emitting diode 3 and light-receiving unit 7 are fixed and the scale 5 is moved to measure displacement amount. In other words, in the case of the present embodiment, the scale 5 need only be provided so as to be capable of relative movement with respect to the light-emitting diode 3 and the light-receiving unit 7.

Next, measurement operation of the photoelectric encoder 1 is briefly described.

When light L from the light-emitting diode 3 is irradiated onto the optical grid 11 of the scale 5, a light-and-dark pattern of light occurs in the X direction due to the optical grid 11. Moreover, change in the light-and-dark pattern caused by moving the holder 19 in the X direction (sinusoidal light signal) is detected by each of the photodiodes formed in the light-receiving unit 7.

An electrical signal generated by each phase of light-and-dark pattern is sent to the IC chip 17 via the light-blocking layer 20 and the photodiodes. In the IC chip 17, after a certain processing (removal of direct current component, and so on) has been performed on the electrical signals corresponding to A phase and B phase light-and-dark patterns, displacement amount is calculated based on these processed electrical signals. Then, this calculation result is outputted to a display unit not illustrated. The above represents operation of the photoelectric encoder 1.

Next, the light-receiving unit 7 of the present embodiment is described.

The light-receiving unit 7 comprises a p− type semiconductor substrate. A silicon substrate, for example, may be employed as the p− type semiconductor substrate. An n+ type semiconductor region, for example, is formed with a certain pitch in the X direction on a surface of the semiconductor substrate. This semiconductor region may also be called an impurity region. The semiconductor region is formed having a Y direction orthogonal to the X direction as a long direction. This structure results in a junction portion of the p− type semiconductor substrate and the n+ type semiconductor region becoming a photodiode (light-receiving element). Moreover, a region of a surface of the semiconductor substrate where the semiconductor region is formed becomes a light-receiving surface of the photodiode.

Next, arrangement of the photodiodes in the light-receiving unit 7 of the present embodiment is described, but as a premise for that description, the case of conventional technology is briefly described. Note that in the description below, a length in the X direction is sometimes simply called "width", and a length in the Y direction is sometimes simply called "height".

Figure 6:
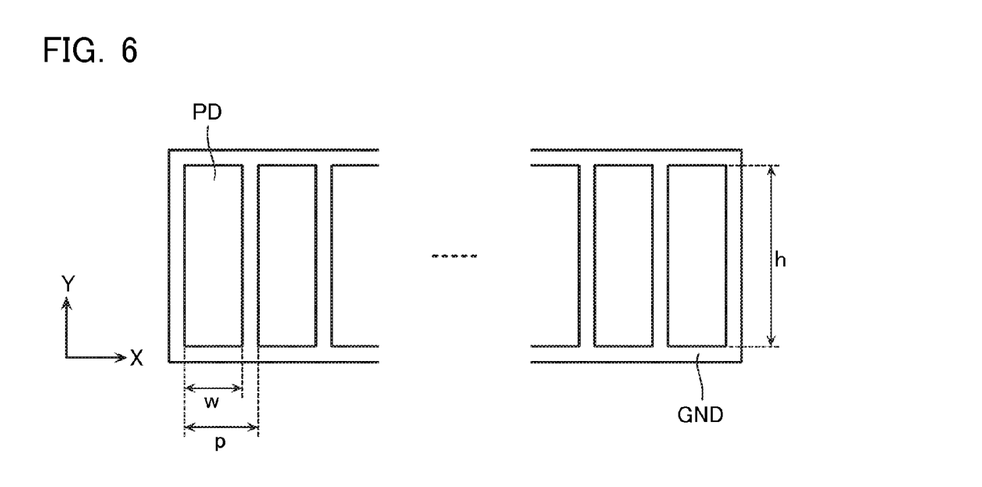
FIG. 6 is a view explaining arrangement of light-receiving elements in a light-receiving unit in a photoelectric encoder according to conventional technology.

FIG. 6 is a view explaining arrangement of photodiodes in a light-receiving unit in a photoelectric encoder according to conventional technology. In the case of the conventional technology, a plurality of photodiodes PD are disposed in a line in the X direction (direction of measurement axis). As shown in FIG. 6, when width of the photodiode is assumed to be w and height of the photodiode is assumed to be h, detection pitch p of the light signal cannot be made less than w. Moreover, a minimum processing dimension of a width w of the photodiode PD is determined by a manufacturing process of the photodiode. In other words, the case of the conventional technology results in the detection pitch of the light signal being limited by the manufacturing process of the photoelectric encoder.

Figure 2:
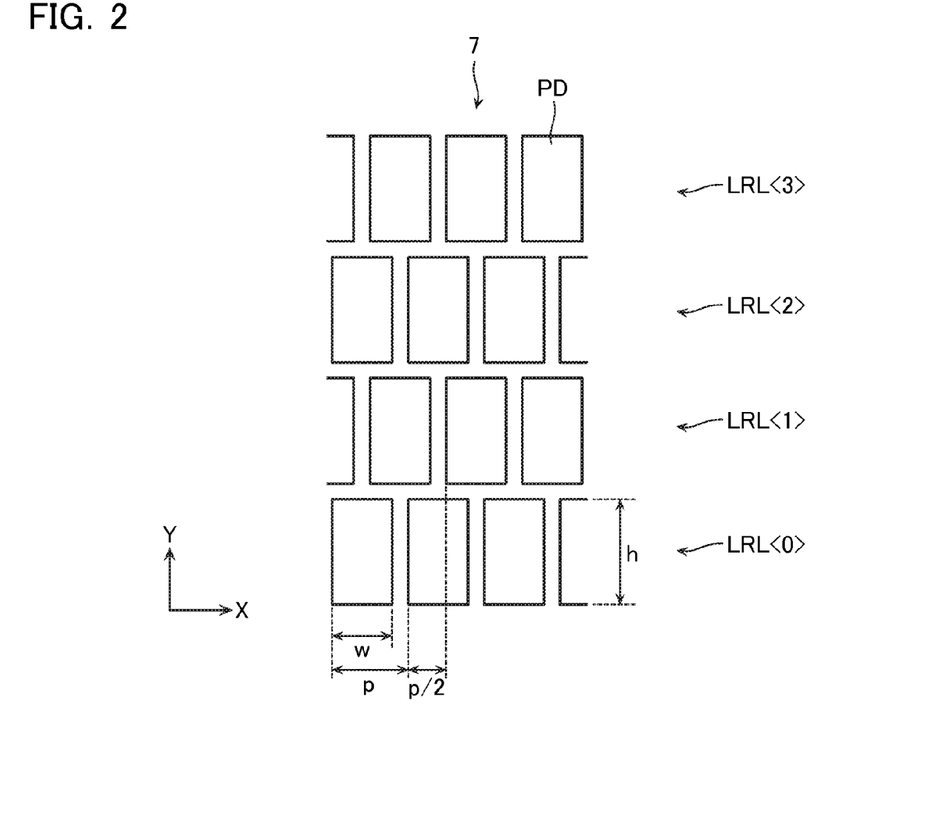
FIG. 2 is a view explaining arrangement of light-receiving elements in a light-receiving unit in the photoelectric encoder according to the embodiment.

Accordingly, in the present embodiment, arrangement of the photodiodes in the light-receiving unit 7 is performed as follows. FIG. 2 is a view explaining arrangement of the photodiodes in the light-receiving unit 7 in the photoelectric encoder 1 according to the present embodiment.

In the case of the present embodiment, the light-receiving unit 7 comprises a plurality of light-receiving element columns LRL<0>~LRL<3> disposed in the Y direction on the semiconductor substrate.

The light-receiving element columns LRL are each configured from a plurality of photodiodes PD disposed in the X direction. When a width and a height of the photodiode PD are assumed to be w and h, respectively, each of the light-receiving element columns LRL has a pitch (pitch p) of an arrangement pattern of the photodiodes PD (below, arrangement pattern of the photodiodes PD is sometimes simply called "arrangement pattern") which is a minimum of w and a height of the arrangement pattern which is h.

In addition, the plurality of light-receiving element columns LRL all have an identical pitch (pitch p) in the X direction of the arrangement pattern. Moreover, the arrangement pattern of certain light-receiving element columns LRL and other light-receiving element columns LRL are staggered by a certain phase in the X direction. By disposing the plurality of light-receiving element columns LRL staggered in the X direction in this way, the light-receiving unit 7, when viewed in entirety, is enabled to make the pitch in the X direction of the arrangement pattern, in other words, the detection pitch of the light signal, smaller than the pitch p of the photodiode PD.

Specifically, for example, in the case of FIG. 2, when the light-receiving element columns LRL<0> and LRL<2> having a phase in the X direction of the arrangement pattern which is identical are assumed to be "first light-receiving element columns" and, similarly, the light-receiving element columns LRL<1> and LRL<3> having a phase in the X direction of the arrangement pattern which is identical are assumed to be "second light-receiving element columns", the first light-receiving element columns and the second light-receiving element columns are disposed such that a stagger in phase in the X direction of the arrangement pattern is 180 degrees. In this case, the detection pitch of the light signal can be reduced to p/2.

However, simply disposing the photodiodes PD as in FIG. 2 results in the light signal in an overlapping region in the X direction of the light-receiving surface of the photodiode PD in the first light-receiving element column and the light-receiving surface of the photodiode PD in the second light-receiving element column being detected in duplicate by the first light-receiving element column and the second light-receiving element column.

Accordingly, in order to solve this problem, the present embodiment further provides a light-blocking layer 20 to the light-receiving unit 7. The light-blocking layer 20 may be formed in, for example, a metal layer formed on the light-receiving surface of the photodiode PD, and so on.

Figure 3:
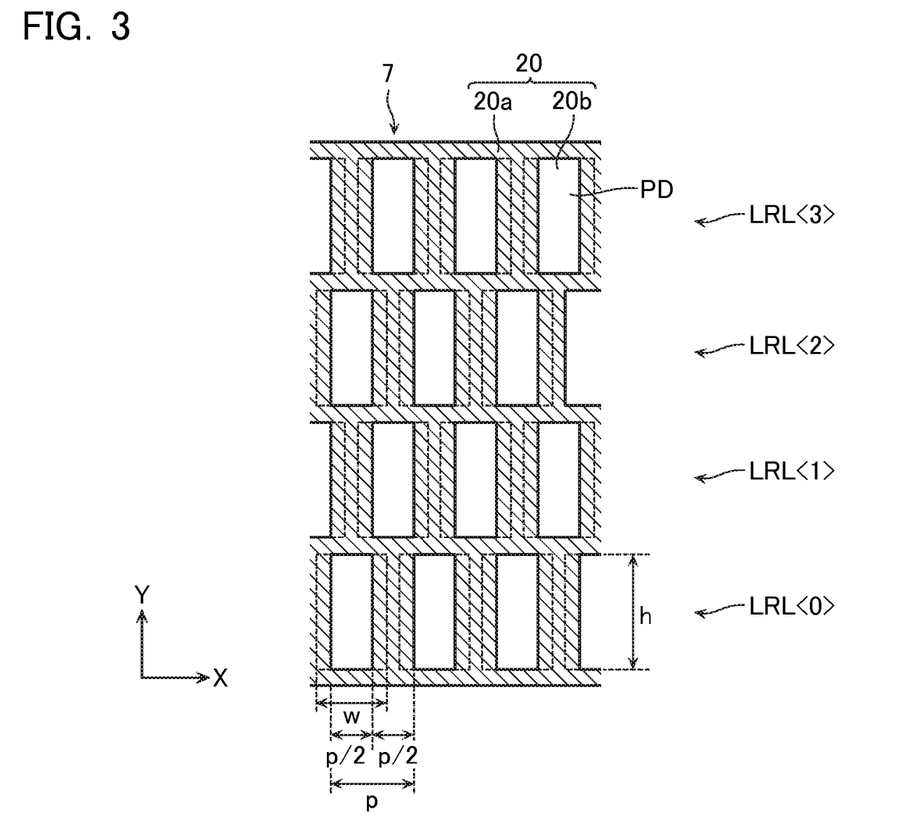
FIG. 3 is a view further representing a light-blocking layer on the view explaining arrangement of the light-receiving elements in FIG. 2.

FIG. 3 is a plan view of the light-receiving unit 7 having the light-blocking layer 20 further represented on the view explaining arrangement of the photodiodes PD shown in FIG. 2.

The light-blocking layer 20 is above the light-receiving surface of the photodiodes PD, and includes a light-blocking portion 20a for blocking the light signal and a light-transmitting portion 20b for allowing transmission of the light signal. The light-blocking portion 20a of the light-blocking layer 20 is formed in a part of the overlapping region in the X direction of the light-receiving surface of the photodiode PD in the first light-receiving element column and the light-receiving surface of the photodiode PD in the second light-receiving element column. Forming the light-blocking layer 20 in this way enables detection of the light signal overlapping with that in the second light-receiving element column, in the region where the light-blocking portion 20a is formed, to be avoided.

Now, as shown in FIG. 3, in order to completely avoid overlapping detection of the light signal by the first light-receiving element column and the second light-receiving element column, it is only required that, when the region of the light-receiving surface of the photodiode PD where the light-transmitting portion 20b is formed is assumed to be a "light-receiving region", the light-blocking portion 20a of the light-blocking layer 20 is formed such that the light-receiving region in the first light-receiving element column and the light-receiving region in the second light-receiving element column do not overlap when staggered in the Y direction. In other words, it is only required that the light-blocking portion 20a of the light-blocking layer 20 is formed to include an overlapping region in the X direction of the light-receiving surface of the photodiode PD in the first light-receiving element column (LRL<0> and LRL<2> in FIG. 3) and the light-receiving region of the photodiode PD in the second light-receiving element column (LRL<1> and LRL<3> in FIG. 3), on the first light-receiving element column, and is formed to include an overlapping region in the X direction of the light-receiving surface of the photodiode PD in the second light-receiving element column and the light-receiving region of the photodiode PD in the first light-receiving element column, on the second light-receiving element column.

Figure 4A:
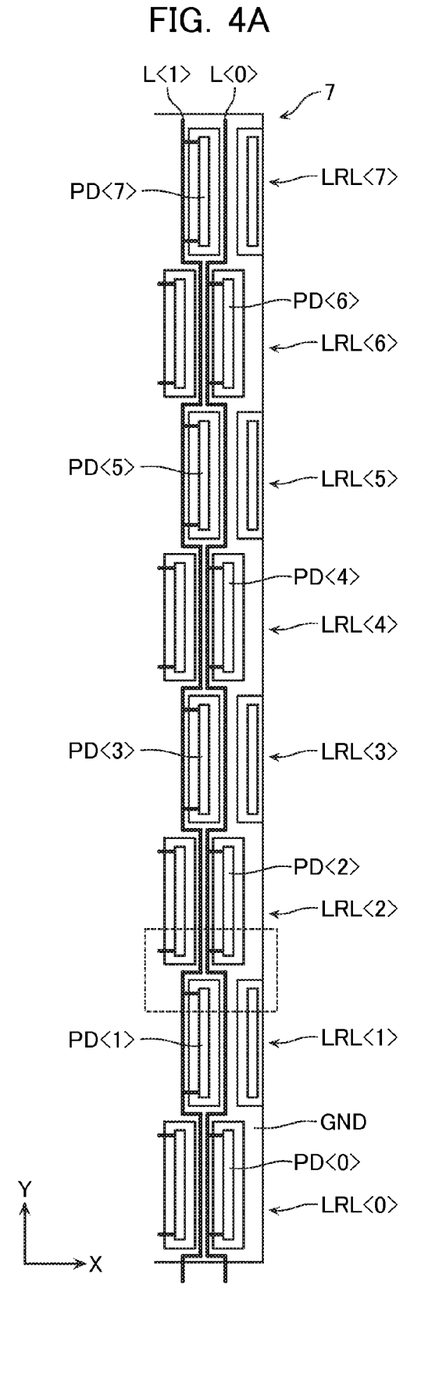
FIG. 4A is a view showing an image of electrical connection in the light-receiving unit in the photoelectric encoder according to the embodiment.
Figure 4B:
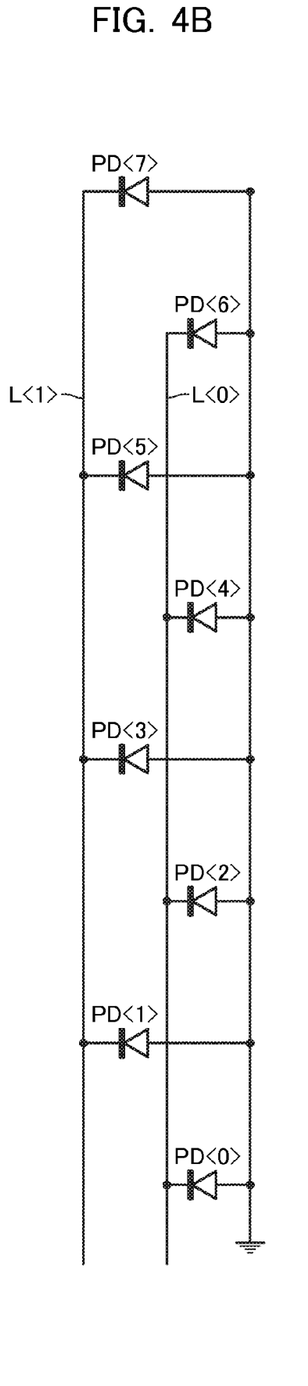
FIG. 4B is a view showing an equivalent circuit of the light-receiving unit in the photoelectric encoder according to the embodiment.

Next, a method of electrical connection between the photodiodes PD shown in FIGS. 2 and 3 is described. FIGS. 4A and 4B are views explaining the method of electrical connection in the light-receiving unit 7. FIG. 4A is a view having an image of a relationship of electrical connection overlapped onto a view of the arrangement of the photodiodes PD in the light-receiving unit 7, and FIG. 4B is an equivalent circuit diagram of the light-receiving unit 7. In the case of FIG. 4, a total of eight light-receiving element columns LRL<0>~LRL<7> are shown. Of these, the light-receiving element columns LRL<0>, LRL<2>, LRL<4>, and LRL<6> correspond to the first light-receiving element column, and the light-receiving element columns LRL<1>, LRL<3>, LRL<5>, and LRL<7> correspond to the second light-receiving element column. Moreover, the stagger in phase in the X direction of the arrangement pattern of the first light-receiving element column and the second light-receiving element column is 180 degrees, similarly to in FIGS. 2 and 3. Note that heavy lines L<0> and L<1> in FIG. 4A each indicate wiring on a cathode side of the photodiodes PD.

In the case of the present embodiment, in the plurality of light-receiving element columns that have a phase in the X direction of the arrangement pattern which is the same, the photodiodes PD in the same position in the X direction are connected in parallel. In the case of FIGS. 4A and 4B, cathodes of the four photodiodes PD in the light-receiving element columns LRL<0>, LRL<2>, LRL<4>, and LRL<6> that are in the same position in the X direction, namely cathodes of the photodiodes PD<0>, PD<2>, PD<4>, and PD<6> are commonly connected. Similarly, cathodes of the four photodiodes PD in the light-receiving element columns LRL<1>, LRL<3>, LRL<5>, and LRL<7> that are in the same position in the X direction, namely cathodes of the photodiodes PD<1>, PD<3>, PD<5>, and PD<7> are commonly connected. Moreover, anodes of all of the photodiodes PD<0>~PD<7> are connected to ground.

Connecting fellow photodiodes PD that are in the same position in the X direction in parallel in this way enables the light-receiving region per one pixel in the X direction to be adjusted.

Figure 5:
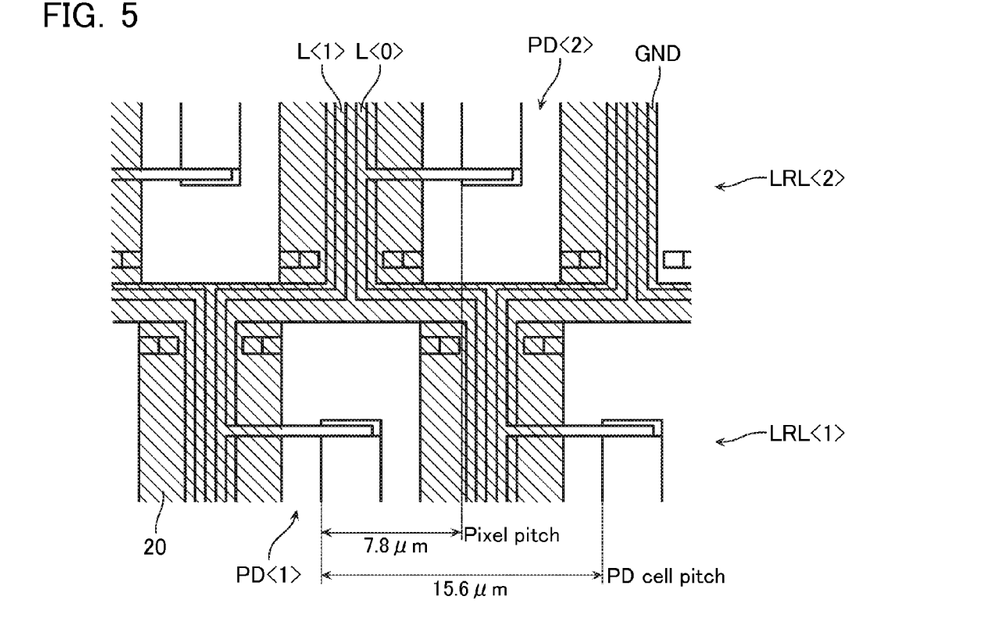
FIG. 5 is a view showing a detection pitch of a light-and-dark pattern of light in the light-receiving unit shown in FIG. 3.

Finally, advantages due to the present embodiment are summarized based on a specific example. FIG. 5 is a view enlarging the region surrounded by a broken line shown in FIG. 4A. In this example, the pitch p of one photodiode PD is formed at 15.6 μm. In the case of FIG. 5, staggering the phase in the X direction of the arrangement pattern of the first light-receiving element columns LRL<2>, and so on, and the second light-receiving element columns LRL<1>, and so on, by 180 degrees enables the detection pitch of the light signal to be set to 7.8 μm which is half of the pitch p=15.6 μm of the photodiode PD. In such a way, the present embodiment enables a detection pitch of the light signal which is smaller than the pitch p limited by the width w of the light-receiving element to be realized, as mentioned above. Moreover, as explained using FIGS. 4A and 4B, connecting fellow light-receiving elements disposed at the same position in the X direction in parallel also enables adjustment of the light-receiving region per one pixel.

Note that in the case of the present embodiment, it is required to divide the light-receiving elements in the Y direction, hence, compared to the conventional technology where only one column of light-receiving elements is disposed in the X direction, the light-receiving region per one pixel is reduced. However, broadening an arrangement region of the light-receiving elements (light-receiving element column) in the Y direction makes it possible to secure the light-receiving region per one pixel. In this regard, the present embodiment is particularly useful in a photoelectric encoder having an object of one-dimensional measurement with no restriction in size in the Y direction.

Moreover, the present embodiment described the case where the stagger in phase in the X direction of the arrangement pattern of a plurality of light-receiving element columns is 180 degrees. However, the stagger in the X direction of a phase pattern between the light-receiving element columns is not restricted to this. For example, in the case where the phase in the X direction of the plurality of light-receiving element columns is staggered by 120 degrees at a time to perform the arrangement, the detection pitch of the light signal can be narrowed to ⅓ of the arrangement pitch p of the light-receiving elements.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A photoelectric encoder, comprising:
a light source;
a scale for generating a light-and-dark pattern of light in a first direction along a measurement axis by light irradiated from the light source; and
a light-receiving unit including: a first and second light-receiving element columns each configured from a plurality of light-receiving elements, the light-receiving elements of the first and second element column each being arranged in the first direction at a pitch and configured to detect the light-and-dark pattern of light with the same phase, each of the light-receiving elements having a light-receiving surface having a quadrilateral shape; and a light-blocking layer configured from a light-blocking portion and light-transmitting portions, the light-blocking layer being formed on the light-receiving surfaces of the light-receiving elements, the light-blocking portion configured to block the light-and-dark pattern of light into the light-receiving surfaces, and the light-transmitting portions configured to allow transmission of the light-and-dark pattern of light into the light-receiving surfaces,
the first and second light-receiving element columns being disposed staggered in a second direction orthogonal to the first direction such that an arrangement pattern of the light-receiving elements in the first and second light-receiving element columns has the pitch which is the same in the first direction and a phase which differs in the first direction,
the light-blocking layer being formed such that the light-transmitting portions on the first light-receiving element column and the light-transmitting portions on the second light-receiving element column do not overlap each other when staggered in the second direction,
a width in the first direction of each of the light-transmitting portions being more than ½ of a width in the first direction of the light-receiving surface of each of the light-receiving elements,
a single light-transmitting portion being arranged on a middle of each light-receiving surface in the first direction,
the light-blocking portion covering both edges along the second direction of each light-receiving surface in the first direction, and
all of the light-transmitting portions on the first light-receiving element column and all of the light-transmitting portions on the second light-receiving element column being arranged in the first direction at the pitch, respectively.

2. The photoelectric encoder according to claim 1, wherein
a phase difference in the first direction of the arrangement pattern of the light-receiving elements in the first and second light-receiving element columns is 180 degrees.

3. The photoelectric encoder according to claim 1, wherein
the light-receiving unit includes a plurality of at least one of the first and second light-receiving element columns.

4. The photoelectric encoder according to claim 3, wherein
the light-receiving unit includes a plurality of the first and second light-receiving element columns disposed alternately in the second direction.

5. The photoelectric encoder according to claim 3, wherein
the light-receiving element is a photodiode, and
a plurality of the photodiodes disposed at the same position in the first direction are connected in parallel.

6. The photoelectric encoder according to claim 1, wherein
the light-blocking layer is configured from a metal.

7. A photoelectric encoder, comprising:
a light source;
a scale for generating a light-and-dark pattern of light in a first direction along a measurement axis by light irradiated from the light source; and
a light-receiving unit including: a first and second light-receiving element columns each configured from a plurality of light-receiving elements, the light-receiving elements of the first and second element column each being arranged in the first direction at a pitch and configured to detect the light-and-dark pattern of light with the same phase, each of the light-receiving elements having a light-receiving surface having a quadrilateral shape; and a light-blocking layer configured from a light-blocking portion and light-transmitting portions, the light-blocking layer being formed on the light-receiving surfaces of the light-receiving elements, the light-blocking portion configured to block the light-and-dark pattern of light into the light-receiving surfaces, and the light-transmitting portions configured to allow transmission of the light-and-dark pattern of light into the light-receiving surfaces,
the first and second light-receiving element columns being disposed staggered in a second direction orthogonal to the first direction such that an arrangement pattern of the light-receiving elements in the first and second light-receiving element columns has the pitch which is the same in the first direction and a phase which differs in the first direction, the light-blocking layer being formed such that the light-transmitting portions on the first light-receiving element column and the light-transmitting portions on the second light-receiving element column do not overlap each other when staggered in the second direction, and when a region of the light-receiving surface of the light-receiving element where the light-transmitting portion of the light-blocking layer is formed is assumed to be a light-receiving region, being formed such that the light-blocking portion includes an overlapping region in the first direction of the light-receiving surface in the first light-receiving element column and the light-receiving region in the second light-receiving element column on the first light-receiving element column, a width in the first direction of each of the light-transmitting portions being more than ½ of a width in the first direction of the light-receiving surface of each of the light-receiving elements, a single light-transmitting portion being arranged on a middle of each light-receiving surface in the first direction, the light-blocking portion covering both edges along the second direction of each light-receiving surface in the first direction, and all of the light-transmitting portions of the first light-receiving element column and all of the light-transmitting portions of the second light-receiving element column being arranged in the first direction at the pitch, respectively.

8. The photoelectric encoder according to claim 7, wherein
a phase difference in the first direction of the arrangement pattern of the light-receiving elements in the first and second light-receiving element columns is 180 degrees.

9. The photoelectric encoder according to claim 7, wherein
the light-receiving unit includes a plurality of at least one of the first and second light-receiving element columns.

10. The photoelectric encoder according to claim 9, wherein
the light-receiving unit includes a plurality of the first and second light-receiving element columns disposed alternately in the second direction.

11. The photoelectric encoder according to claim 9, wherein
the light-receiving element is a photodiode, and
a plurality of the photodiodes disposed at the same position in the first direction are connected in parallel.

12. The photoelectric encoder according to claim 7, wherein
the light-blocking layer is configured from a metal.

* * * * *